US009013670B2

(12) United States Patent  
Hwang et al.

(10) Patent No.: US 9,013,670 B2
(45) Date of Patent: Apr. 21, 2015

(54) FIRST SUBSTRATE SHEET, LIQUID CRYSTAL PANEL HAVING FIRST SUBSTRATE SHEET AND METHOD FOR MANUFACTURING SAME

(75) Inventors: Hyun Ha Hwang, Seoul (KR); Seung Gon Kang, Hwaseong-si (KR)

(73) Assignee: Imagelab Co., Ltd. (KR)

( * ) Notice: Subject to any disclaimer, the term of this patent is extended or adjusted under 35 U.S.C. 154(b) by 408 days.

(21) Appl. No.: 13/496,554

(22) PCT Filed: Oct. 8, 2010

(86) PCT No.: PCT/KR2010/006896
§ 371 (c)(1),
(2), (4) Date: Mar. 16, 2012

(87) PCT Pub. No.: WO2011/043621
PCT Pub. Date: Apr. 14, 2011

(65) Prior Publication Data
US 2012/0188488 A1    Jul. 26, 2012

(30) Foreign Application Priority Data

Oct. 9, 2009 (KR) .................. 10-2009-0096419

(51) Int. Cl.
G02F 1/1334 (2006.01)
G02F 1/1333 (2006.01)
G02F 1/137 (2006.01)

(52) U.S. Cl.
CPC ............ *G02F 1/1333* (2013.01); *G02F 1/1334* (2013.01); *G02F 1/133305* (2013.01); *G02F 1/13718* (2013.01); *G02F 1/13737* (2013.01)

(58) Field of Classification Search
None
See application file for complete search history.

(56) References Cited

U.S. PATENT DOCUMENTS

| | | | | |
|---|---|---|---|---|
| 3,585,381 A * | 6/1971 | Hodson et al. | .................. | 349/21 |
| 4,579,423 A * | 4/1986 | Fergason | ........................ | 349/86 |
| 5,056,898 A * | 10/1991 | Ma et al. | ......................... | 349/94 |
| 6,094,244 A * | 7/2000 | Kawata et al. | .................. | 349/74 |
| 6,181,393 B1 * | 1/2001 | Enomoto et al. | ................ | 349/86 |
| 6,323,928 B1 * | 11/2001 | Petruchik | ...................... | 349/142 |
| 6,585,849 B2 * | 7/2003 | Smith et al. | ..................... | 156/326 |
| 2004/0027327 A1 * | 2/2004 | LeCain et al. | ................ | 345/107 |
| 2004/0058612 A1 * | 3/2004 | Hiji et al. | ........................ | 445/24 |

(Continued)

FOREIGN PATENT DOCUMENTS

JP   05-297381 A   11/1993
JP   07-287214 A   10/1995

(Continued)

OTHER PUBLICATIONS

English translation of written opinion for PCT/KR2010/006896, mailing date Jun. 30, 2011.*

(Continued)

*Primary Examiner* — Mike Stahl
(74) *Attorney, Agent, or Firm* — Cantor Colburn LLP

(57) ABSTRACT

The present invention relates to a liquid crystal panel having the first substrate sheet. The object of the present invention can be accomplished by a liquid crystal capsule which is mixed with a binder and printed on one surface of the first substrate on which the transparent electrode is formed; a transparent adhesive applied to entirely cover the liquid crystal capsule and the binder printed on the first substrate; and a releasing sheet which is attached to entirely cover the transparent adhesive applied on the first substrate.

14 Claims, 8 Drawing Sheets

(56) References Cited

U.S. PATENT DOCUMENTS

| | | | |
|---|---|---|---|
| 2006/0027783 A1* | 2/2006 | Kokeguchi et al. | 252/299.01 |
| 2007/0109219 A1* | 5/2007 | Whitesides et al. | 345/55 |
| 2007/0139299 A1* | 6/2007 | Huang et al. | 345/3.1 |
| 2007/0153361 A1* | 7/2007 | Danner et al. | 359/296 |
| 2010/0151228 A1* | 6/2010 | Chin et al. | 428/323 |
| 2011/0007253 A1* | 1/2011 | Stocq | 349/122 |

FOREIGN PATENT DOCUMENTS

| | | |
|---|---|---|
| JP | 2000-147479 A | 5/2000 |
| JP | 2000-267071 A | 9/2000 |
| KR | 1020050013568 A | 2/2005 |
| KR | 1020060128660 A | 12/2006 |
| KR | 10-0704569 B1 | 4/2007 |
| KR | 1020070100037 A | 10/2007 |

OTHER PUBLICATIONS

Written Opinion for PCT/KR2010/006896 dated Jun. 30, 2011.
International Search Report for PCT/KR2010/006896 dated Jun. 30, 2011.

* cited by examiner (a)

(b)

(c)

FIRST SUBSTRATE SHEET, LIQUID CRYSTAL PANEL HAVING FIRST SUBSTRATE SHEET AND METHOD FOR MANUFACTURING SAME

FIELD OF THE INVENTION

The present invention relates to a liquid crystal display device and a method of manufacturing the same, and more particularly, to a first substrate that may simplify display apparatus manufacturing processes, improve yield, and reduce manufacturing costs, and which is highly advantageous in manufacturing a flexible display, through a liquid crystal capsule, an adhesive, and a releasing sheet integrally formed on a first substrate, a liquid crystal panel having the first substrate sheet, and a method of manufacturing the same.

DESCRIPTION OF THE RELATED ART

With active development and supply of display devices, liquid crystal display devices have been widely used. In recent years, flexible display devices have actively been developed.

A conventional liquid crystal display device includes an upper substrate on which a common electrode is formed, a lower substrate on which a pixel electrode is formed, and a liquid crystal injected between the upper substrate and the lower substrate. The liquid crystal display device drives the liquid crystal by electric field applied to the command electrode and the pixel electrode, and has excellent transmittance and aperture ratio.

FIG. 1 is a cross-sectional view illustrating a display panel for describing a configuration and an operation of a reflective liquid crystal display device according to the related art. Referring to FIG. 1, a lower substrate of the display panel is configured by a glass substrate (transmittance insulation substrate). A lower electrode 2 with a pixel electrode is patterned on the glass substrate 1. An orientation film 3 orientating a liquid crystal molecule is formed on the lower electrode 2. A polarizing plate 4 is provided in a lower side surface of the glass substrate 1. The upper substrate is configured by the glass substrate 1. A transparent conductive film 2 corresponding to a common electrode is deposited on a lower surface of the glass substrate 1 and the orientation film 3 is then formed in a lower portion of the transparent conductive film 2. A polarizing plate 4 and a reflection plate 11 are sequentially formed at an upper side of the glass substrate 1. The upper substrate and the lower substrate are configured in such a way that rubbing directions of the orientation film 3 are controlled perpendicular to each other to maintain a constant interval as a spacer, a pair of substrates are absorbed, the liquid crystal 6 is injected and sealed, a lower electrode of the lower substrate and a transparent conductive film of the upper substrate are connected to each other by a signal power supply 7.

However, in a method of manufacturing a liquid crystal display device according to the related art, substrates have a glass substrate, a pair of substrates are absorbed through a hot press process, and a liquid crystal is inserted in a space between the substrates. Accordingly, because the manufacturing method of the relate art is not suitable to a process of manufacturing a flexible display device constructing a panel substrate by plastic materials sensitive to heat, it has a difficult in implementing the flexible display device.

That is, when a panel of a plastic film substrate is made using a hot press process, because a film curl occurs, a process become long and complicated to increase manufacturing cost. Furthermore, so as to manufacture one display panel, there is a need for forming an orientation and for arranging a spacer. An end seal process is required after injection of a liquid crystal. As illustrated previously, the manufacturing process is long and complicated to reduce process yield ratio.

Moreover, a polarizing plate is substantially used in the liquid crystal display device according to the related art, errors in an adhesion direction of the polarizing plate causes deterioration in optical characteristics of an overall liquid crystal cell. The adhesion of the polarizing plate makes the process complicated. Light absorbed in the polarizing plate is converted into heat to increase a temperature. The increase in the temperature deteriorates characteristics of a liquid cell.

SUMMARY OF THE INVENTION

The present invention has been made in view of the above problems, and provides a first substrate sheet that may simplify display apparatus manufacturing processes, improve yield, and reduce manufacturing costs by omitting most processes and structural elements of a device which are required in a process of manufacturing a display device, a liquid crystal with the first substrate sheet, and a method of manufacturing the same.

The present invention further provides a first substrate sheet which is highly advantageous in manufacturing a flexible display by encapsulating a liquid crystal to integrally adhering it on one substrate and simply adhering a pair of substrates facing each other to manufacture a panel of the display device, a liquid crystal with the first substrate sheet, and a method of manufacturing the same.

The foregoing object is achieved by a first substrate sheet including: a first substrate arranged to face the second substrate; a transparent electrode formed on one surface of the first substrate; a liquid crystal capsule which is mixed with a binder and printed on one surface of the first substrate on which the transparent electrode is formed; a transparent adhesive applied to entirely cover the liquid crystal capsule layer and the binder; and a releasing sheet which is attached to entirely cover the transparent adhesive, and which is made of a completely removable material which does not deteriorate the adhesive force of the transparent adhesive.

In a first substrate sheet, a liquid crystal with the first substrate sheet, and a method of manufacturing the same according to the present invention, because a first substrate sheet and a second substrate sheet are simply laminated to complete manufacturing a panel of a display device, there is not a need for injecting a liquid crystal between assembled substrates and a hot press process. Most processes such as end seal, formation of an orientation film, rubbing, arrangement of a spacer necessary for a process of manufacturing a panel of a liquid crystal display device may be omitted. Accordingly, a process of manufacturing a panel of a liquid crystal display may be significantly simplified and the manufacturing cost may be significantly reduced. First of all, because a first substrate on which a liquid crystal is previously formed is simply laminated to a second substrate in an adhesion fashion, the present invention has a remarkable effect in that it is very suitable to a process of manufacturing a flexible display.

In addition, because a polarizing plate is unnecessary, optical characteristic (transmittance) of a display device and the panel may be reduced in thickness. When a cholesteric liquid crystal capsule is applied, a configuration of a separate color filter is unnecessary.

DESCRIPTION OF REFERENCE CHARACTERS

Figure 1:
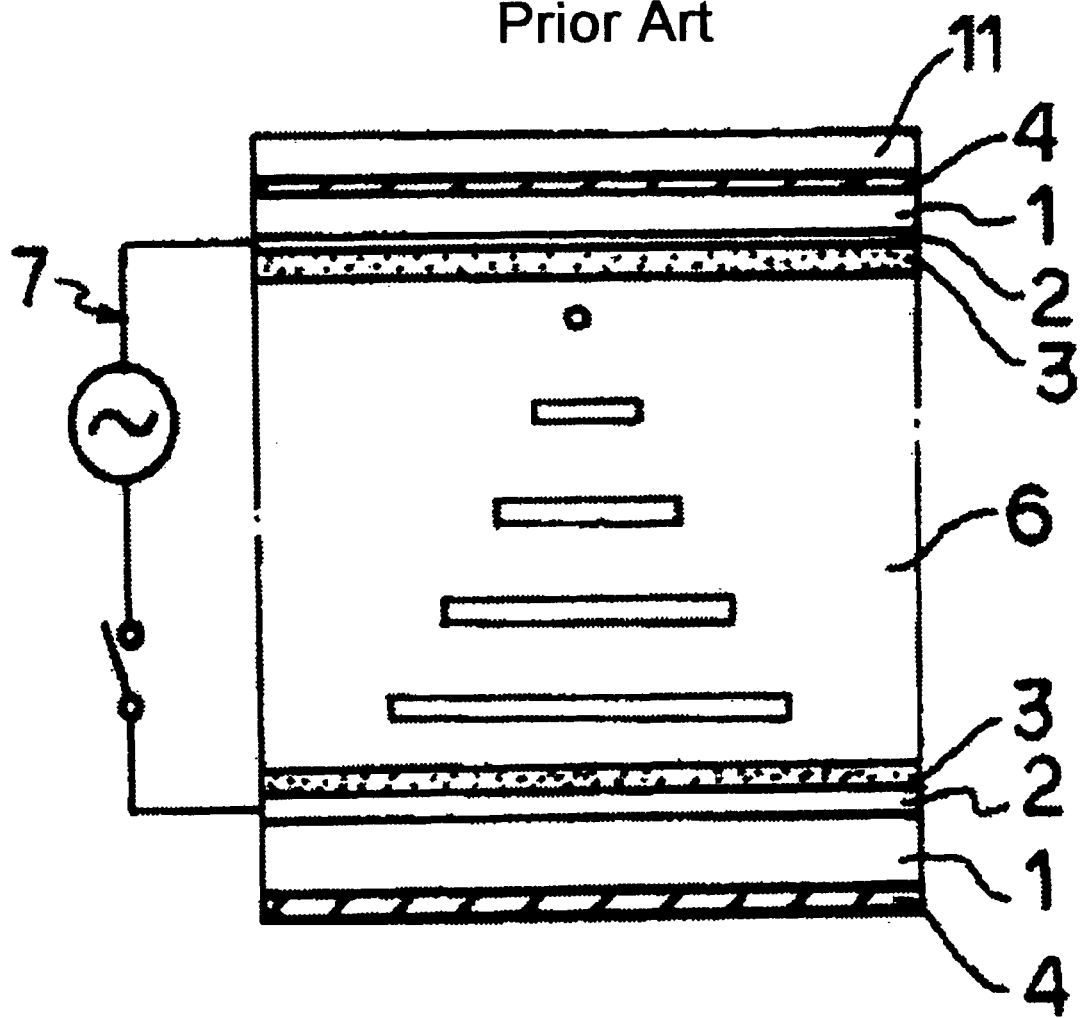
FIG. 1 is a cross-sectional view illustrating a display panel for describing a configuration and an operation of a reflective liquid crystal display device according to the related art.

100: first substrate
110: transparent electrode
120: liquid crystal capsule
130: binder
140: transparent adhesive
150: releasing sheet
200: second substrate
210: lower electrode

DETAILED DESCRIPTION OF EXEMPLARY EMBODIMENTS

A first substrate sheet, a liquid crystal panel with the first substrate sheet, and a method of manufacturing the same may significantly simplify or make display device manufacturing processes convenient through a configuration of the first substrate sheet including an encapsulated liquid crystal, an adhesive 140, and a releasing sheet 150 in a first substrate 100 and a second substrate 200 facing each other constructing a display device, and particularly suggests a technical characteristic which is highly advantageous in manufacturing a flexible display.

Exemplary embodiments of the present invention are described with reference to the accompanying drawings in detail.

Figure 2:
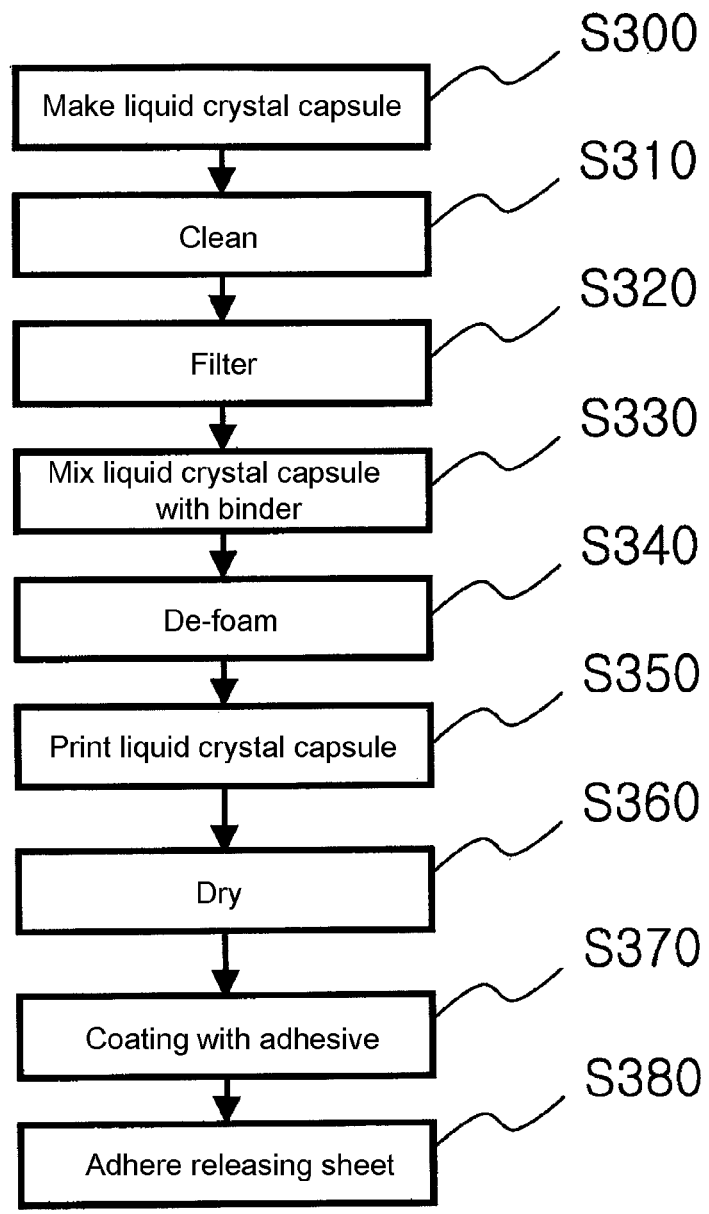
FIG. 2 is a process flowchart illustrating a method of manufacturing a liquid crystal panel including a first substrate sheet according to an embodiment of the present invention.
Figure 3:
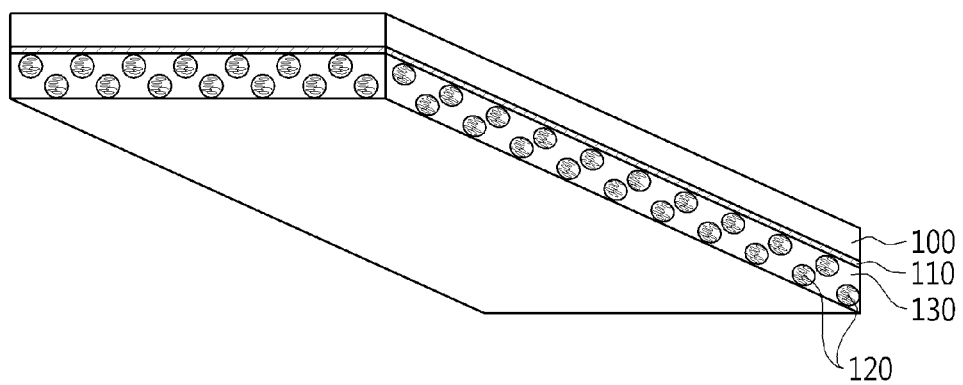
FIG. 3 is a perspective view illustrating a structure of a first substrate sheet by steps manufactured through a process flowchart in FIG. 2.
Figure 3:
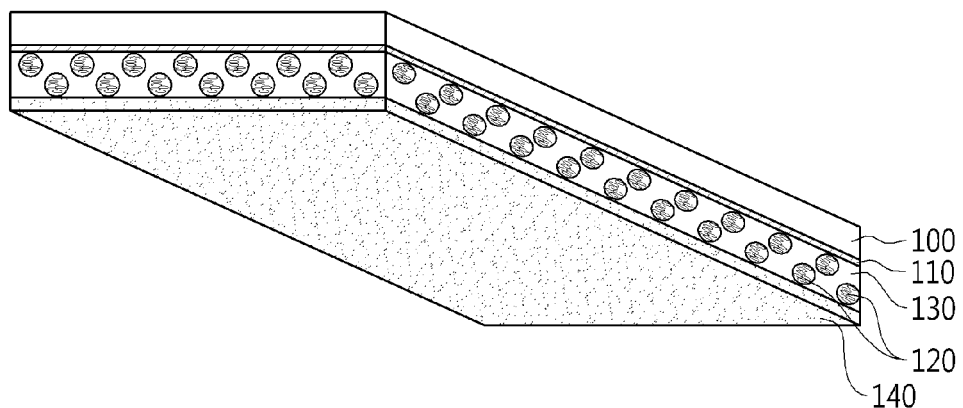
Figure 3:
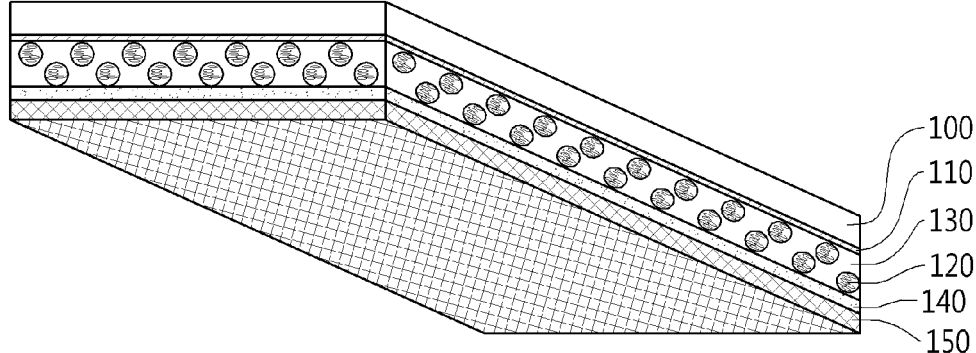
Figure 4:
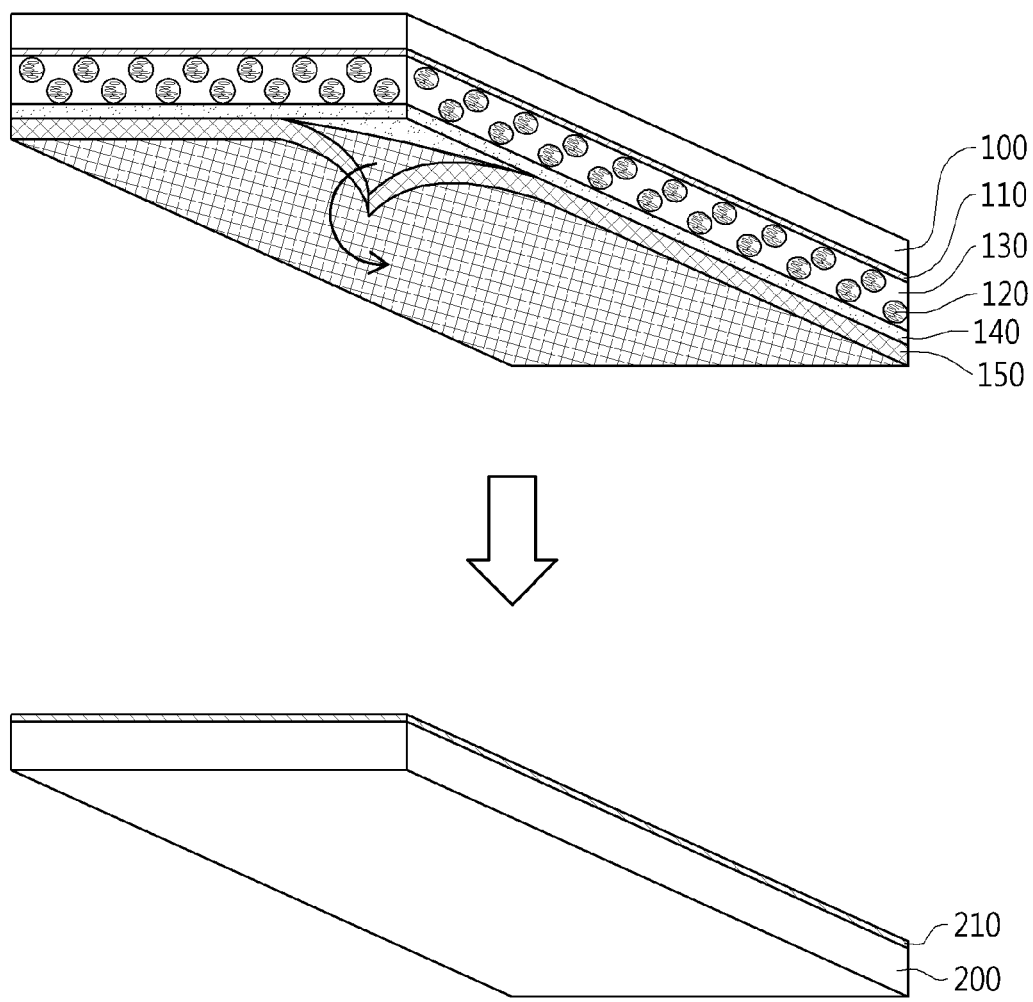
FIG. 4 is a perspective view illustrating a method for laminating the first substrate sheet manufactured in FIG. 3 on a second substrate.

FIG. 2 is a process flowchart illustrating a method of manufacturing a liquid crystal panel including a first substrate sheet according to an embodiment of the present invention, FIG. 3 is a perspective view illustrating a structure of a first substrate sheet by steps manufactured through a process flowchart in FIG. 2, and FIG. 4 is a perspective view illustrating a method for laminating the first substrate sheet manufactured in FIG. 3 on a second substrate.

Referring to FIG. 2 through FIG. 4, a method of manufacturing a liquid crystal panel with a first substrate sheet according to the present invention includes a first substrate process and a second substrate process. The first substrate process includes a manufacturing step of a liquid crystal capsule 120, a step of printing the liquid crystal capsule 120 on a first substrate 100 on which a transparent electrode 110 is formed, coating the first substrate 100 on the liquid crystal capsule 120 is printed with an adhesive 140, and sticking a releasing sheet 150 to a coating surface of the adhesive 140 on the first substrate 100 in detail.

First, a first substrate process corresponding to a main technical idea of the present invention will be described in detail.

(1) Step (S300) of Making Liquid Crystal Capsule

The step S300 is a step of making a liquid crystal capsule 120 having a diameter 20~50 μm using a composite phase separation method, a membrane, and in-situ polymerization.

Liquid crystals such as nematic, smectic, and cholesteric, and chiral smectic liquid crystals typically used for a liquid crystal display may be used as a liquid crystal for manufacturing the capsule not to be limited. A manufactured liquid crystal capsule 120 may further include a dichroic dye and a chiral dopant besides the foregoing liquid crystal.

In detail, the liquid crystal capsule 120 printed on the first substrate 100 according the present invention is manufactured through an emulsion process of forming a droplet of a liquid crystal being a core material, an encapsulation process by coacervate, a process of gelling an outer wall of a capsule, a process of curing the outer wall of the capsule, and precocity process.

The emulsion process is a process of forming a droplet of a liquid crystal being a core material in a water solution with an emulsifier using a homogenizer. It is preferred that one selected from a group consisting of a natural emulsifier such as gelatin, Arabia gum, albumin, alginate, casein, or synthesized emulsifier such as polyurethane, polyacrylic acid, polyethylene, amine, is used as the emulsifier. However, the present invention is not limited thereto.

In the present invention, the gelatin (Type-A, Sigma-Aldrich) or an Arabia gum Fluka is used as the emulsifier. Specifically, one droplet of a liquid crystal (600 g) in which a dichroic dye is solved in 10% Arabia gum water solution 360 g is fallen, and emulsified for ten minutes with increasing rotation speed (rpm) in the order of 6,500/7,500/8,500 using a homogenizer. S-428, M-483 (Mitsui Fine Chemical) is used as an example of a dichroic dye doped in a liquid, and ZLI-1840 (Merck) is used as an example of the liquid crystal.

If the emulsion process is completed, an encapsulation process by coacervate is performed. The encapsulation process by coacervate is a process that forms a coacervate of a water soluble polymer (gelatin, Arabia rubber) through pH adjustment of a water solution, and forms an outer wall of a capsule through combination of the gelatin and the Arabia rubber.

In an embodiment of the present invention, pH is adjusted using citric acid or glacial acetic. Specifically, 10% gelatin water solution 240 g and pure water 600 g are provided and pH is adjusted to 4.5 using the citric acid. Next, 10% gelatin water solution 120 g and pure water 240 g are further provided slowly, and pH is adjusted to 4.4 using the citric acid to complete coacervate.

The coacervate is phase separation in a colloid system, which is separated into two systems including a rich layer and a colloid poor layer by deposition or condensation. In the present invention, the gelatin and the Arabic gum are condensed to have opposite charges to each other in pH 4.4, which is coacervate. As illustrated previously, if the coacervate occurs, the gelatin is electrically charged with a positive charge (+) and the Arabia gum is electrically charged with a negative charge (−), and a water soluble colloid electrically charged with charges opposite to each other are stuck to each other to form an outer wall of the liquid crystal capsule 120.

The liquid crystal encapsulation process by the coacervate is completed, a gelling process progresses. The gelling process is a process of gelling an outer wall of a capsule through variation in a temperature. In an embodiment of the present invention, the liquid crystal capsule is slowly cooled at cooling speed of about 0.2° C. from 40° C. to 20° C. When the temperature reaches 20° C., it is rapidly cooled at cooling speed of about 0.5° C./min. Further, a rotational number of an agitator is increased to agitate such that a liquid crystal capsule is not tied at low temperature according to rapid cooling.

When the gelling process is completed, a process of curing an outer wall of a capsule enters. The process of curing an outer wall of a capsule is a step of curing the outer wall of the capsule by adding a curing agent. The curing agent performs crosslink reaction with amino group of a gelatin using glutaraldehyde or formaldehyde to cure the capsule, a complete liquid capsule 120 is manufactured. In the embodiment of the present invention, glutaraldehyde of 4 g is slowly provided to progress the process of curing an outer wall of the capsule.

When the completed liquid crystal capsule 120 is manufactured through the process of curing an outer wall of the capsule, after it is agitated for about 1 hour, it maintains at room temperature to be increased to the room temperature, is moved to a ball mill, is grown up for about 24 hours, thereby finally obtaining a stable liquid crystal capsule 120.

(2) Cleaning and Filtering Steps of Liquid Crystal Capsule (S310, S320)

The liquid crystal capsule 120 achieved by the foregoing process of manufacturing the liquid crystal capsule 120 needs washing and filtering. The cleaning step is performed using pure water, isopropyl alcohol ethylene glycol, and the like. The filtering step of the liquid crystal capsule is a process of obtaining only a liquid crystal capsule 120 having the desired size and eliminating induced impurities in the process of manufacturing the liquid crystal capsule 120, and may be achieved through a filter paper or a membrane.

(3) Mixing of Liquid Crystal Capsule and Binder and De-Foaming Steps (S330, S340)

The liquid crystal capsule 120 performed by the filtering step should be attached and fixed on one surface of the first substrate 100. This may be accomplished through a binder 130. That is, after the binder 130 is mixed with the liquid crystal capsule 120 with a constant ratio and a resultant paste is printed and fixed on one surface of the first substrate 100.

Specifically, it is preferred that the mixture ratio of the liquid crystal capsule 120 and the binder 130 is one to one. At least one transparent polymer material selected from polyvinyl alcohol, gelatin, formalin resorcinol resin, polyurethane resin, acrylic acid resin, fluorine resin, or polyvinyl pyrrolidone is used as the binder.

Before printing the paste being a combination of the liquid crystal capsule 120 and the binder 130 on the first substrate 100, a defoaming process of eliminating bubbles included in the binder 130 in the mixing process.

(4) Printing and Dry Steps of Liquid Crystal Capsule (S350, S360)

A transparent electrode thin film 110 is formed in one side surface of the first substrate 100 by a deposition method according to the present invention. The transparent electrode 110 is formed using Indium Tin Oxide (ITO), Indium Zinc Oxide (IZO), or transparent conductive polymer group.

The present invention provides a method of manufacturing a first substrate sheet optimally suited to a process of manufacturing a flexible display. A first substrate 100 constructing a display device may be configured by a thin plastic substrate having elastic flexibility as well as a glass substrate.

One selected from polyethylene naphthalate (PEN), polyether sulfone (PES), polyarylate (PAR), polycarbonate (PC) and polyethylene terephthalate (PET) is preferably used as material of the plastic substrate. However, the present invention is not limited thereto.

As illustrated above, the paste being a combination of the liquid crystal capsule 120 and the binder 140 is printed on a one surface of the first substrate 100 on which the transparent electrode 110 is deposited to thereby construct a first substrate sheet.

The method of printing the paste being a combination of the liquid crystal capsule 120 on the first substrate 10 on which the transparent electrode 110 is formed may be achieved by one selected from screen print, stencil printing, offset print. A coating method may be achieved by one selected from gravure coating, knife coating, roll coating, die coating, or reverse coating.

When a process of printing the liquid crystal capsule 120 on the first substrate 100 is terminated, a dry process for eliminating water or solvent included in a paste being a mixture of the liquid crystal capsule 102 and the binder 130 is performed.

(5) Adhesive Coating Step (S370)

If the liquid crystal capsule 120 is printed on the first substrate 100, a process of coating the first substrate 100 with an adhesive 140 is performed. That is, the adhesive is coated in upper parts of the liquid crystal capsule 120 and the binder 130 printed on the first substrate 100 as a whole.

It is preferred that the coated adhesive 140 has a thickness equal to or less than 10 μm.

Furthermore, the adhesive 140 is semi-flexible material that may be easily attached to an attached object but not solidified by weak pressure of a finger and the like, and is configured by a transparent material, and should be a non-conductor.

Preferably, the adhesive may be formed by acrylic copolymer, transparent plastic resin, and transparent epoxy resin. A transparent adhesive 140 used to laminate a polarizing plate attached to an upper substrate or a lower substrate of a liquid crystal display device as a specific example of the adhesive. A transparent adhesive 140 including acrylic copolymer 100 parts by weight, ester plasticizer 0.01 to 20 parts by weight with at least one ether bonding among molecules, and metal salt 0.001 to 25 parts by weight being conjugate of superacid and composed of a negative ion containing perfluoroalkyl group and an alkali metal positive ion.

(6) Attaching Step of Releasing Sheet (S380)

When coating the transparent adhesive 140 is terminated, a process of attaching the releasing sheet 150 is performed.

The releasing sheet is a means for preventing impurities from being attached to an adhesive surface of the transparent adhesive 140. The releasing sheet is configured with the size capable of being attached to entirely cover a coating surface of the adhesive 140, and is made of a completely removable material which does not deteriorate the adhesive force of the adhesive 140. This is why the releasing sheet 150 may be completely removed while maintaining the adhesive force of the adhesive 140 coated on the first substrate 100 in which the first substrate 100 and the second substrate 200 are laminated on each other through the adhesive 140 coated on the first substrate 100.

Accordingly, the releasing sheet 150 is preferably formed by a releasing film having a very low friction coefficient and a different organization and structure from those of the adhesive 140. There is a resin sheet such as a polytetrafluoroethylene (PTFE) called Teflon as a specific example of the releasing sheet 150.

As illustrate previously, the transparent electrode 110, liquid/binder mixing paste, a transparent adhesive 140, and a releasing sheet 150 are sequentially laminated to complete a process of manufacturing a first substrate sheet according to the present invention.

Next, a second substrate process of the present invention will be described.

The second substrate process of the present invention is a process of forming an electrode on a side surface of a second substrate 200 laminated on the first substrate sheet. The second substrate corresponds to a lower substrate on which a lower electrode including a pixel electrode and a gate electrode of a typical liquid crystal display device. The second substrate is applicable to a flexible printed circuit board (FPCB) of polyimide materials as well as a glass substrate and a transparent plastic substrate.

As illustrated previously, a second substrate 200 on which the lower electrode 210 is formed is manufactured through the second substrate process, the second substrate 200 on which the lower electrode 210 is formed is laminated on the first substrate sheet to finally manufacture a liquid crystal panel including a first substrate sheet of the present invention.

Referring to FIG. 4, the first substrate sheet according to the present invention is laminated with the second substrate 200 through a following laminating procedure.

That is, a process of manufacturing a panel of a display device is finally completed through a step of peeling and removing a releasing sheet attached to a first substrate sheet manufactured through the first substrate process and a step of laminating the second substrate sheet with the first substrate sheet using a transparent adhesive exposed due to removal of the releasing sheet 150.

Figure 5:
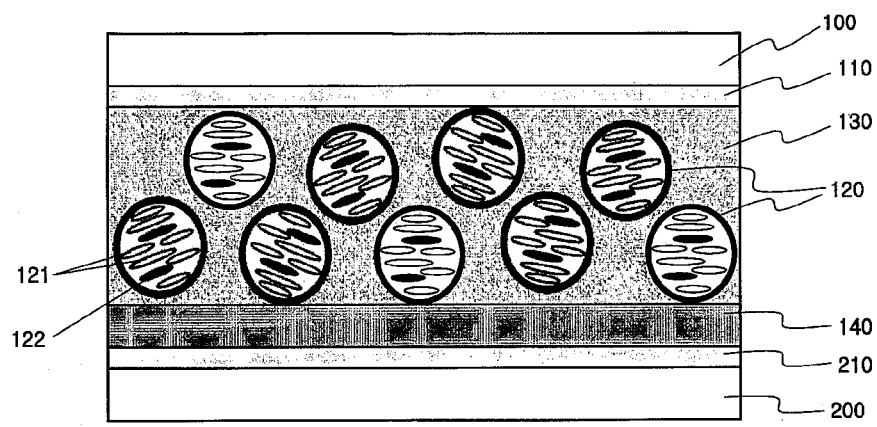
FIG. 5 is a cross-sectional view illustrating a liquid crystal panel with a first substrate sheet according to an embodiment of the present invention.

FIG. 5 is a cross-sectional view illustrating a liquid crystal panel with a first substrate sheet according to an embodiment of the present invention.

In a liquid crystal display of the related art, a pair of substrates are arranged to face each other, a liquid crystal is injected, and an end seal process is needed to be performed. Unlike the forgoing related art, in the present invention shown in FIG. 5, a liquid crystal is encapsulated and integrally fixed on the first substrate 100 in a liquid panel, and a transparent adhesive 140 is coated on an entire surface of the first substrate 100 with a liquid crystal capsule 120, and a first substrate sheet of the present invention is simply stuck to the second substrate 200, with the result that a panel of a display device is completely manufactured. Accordingly, most processes required in a process of manufacturing a typical liquid crystal display device such as a process of injecting a liquid crystal between assembled substrates, an end seal, formation of an orientation film, rubbing, arrangement of spacer, may be omitted. Moreover, the present invention is beneficial that a color filter is not required when a cholesteric liquid crystal capsule 120 is applied.

Accordingly, the present invention may significantly simplify a process of manufacturing a display panel and significantly reduced manufacturing cost. First of all, since a first substrate 100 with an integral liquid crystal is simply laminated with the second substrate in an adhesion manner, the present invention provides a very beneficial strength to a process of manufacturing a flexible display.

Figure 6:
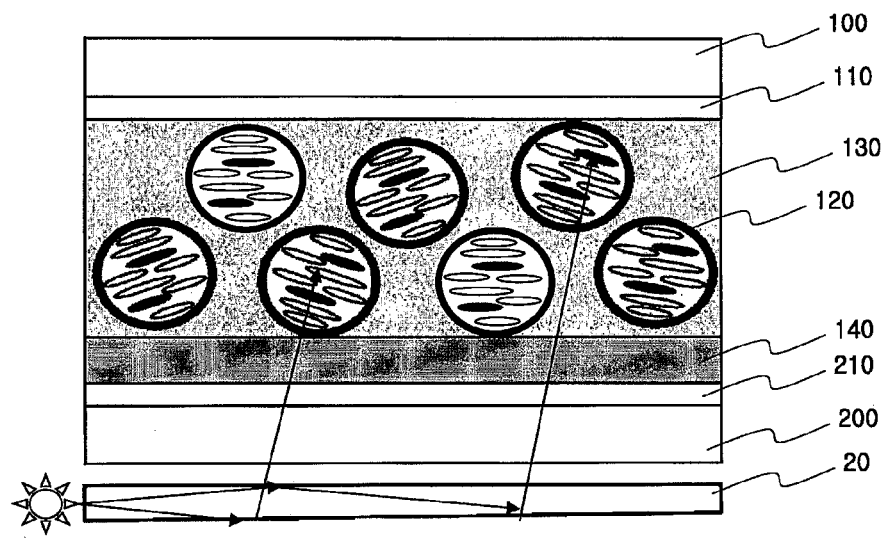
FIGS. 6 and 7 are cross-sectional views illustrating an operation principle of a liquid crystal panel with a first substrate sheet in which a nematic liquid crystal is encapsulated according to an embodiment of the present invention.
Figure 7:
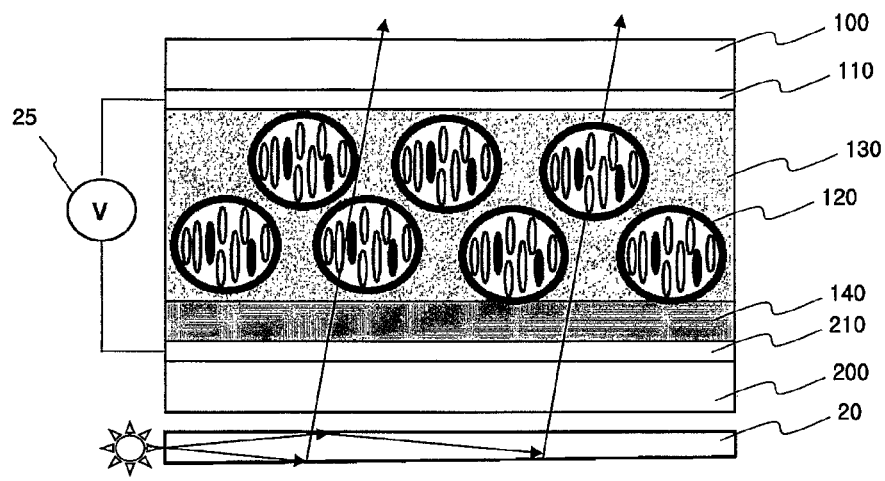

FIGS. 6 and 7 are cross-sectional views illustrating an operation principle of a liquid crystal panel with a first substrate sheet in which a nematic liquid crystal is encapsulated according to an embodiment of the present invention.

In an embodiment of FIGS. 6 and 7, a liquid capsule 120 is manufactured using a nematic liquid crystal. A dichroic dye and a chiral dopant are added into the nematic liquid crystal capsule. An electrode formed on the second substrate 200 is patterned in a structure capable of applying a (+) or (−) polarity, and a common electrode 150 is formed in one surface of the first substrate 100

Accordingly, when the first substrate sheet of the present invention is an off state, light emitted from a backlight 20 is absorbed in a dichroic dye and is not penetrated because of a liquid crystal in a capsule, it displays a black state.

Conversely, if a voltage is applied to a display device of the present invention to turn-on the first substrate sheet, because a liquid crystal in a capsule is arranged parallel with external electric field by the electric field, the light emitted from the backlight 20 penetrates the panel and displays a white state.

Figure 8:
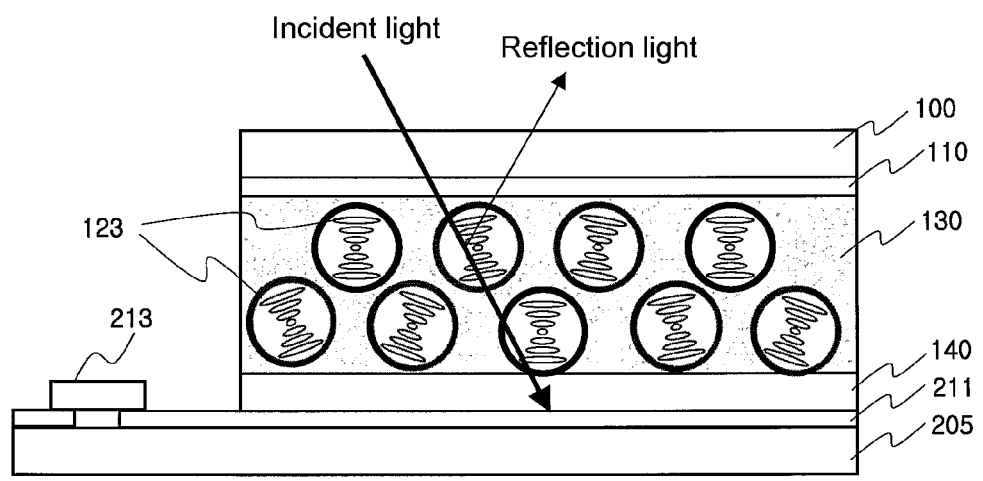
FIG. 8 is a cross-sectional view illustrating a liquid crystal panel to which an FPCB and a cholesteric liquid crystal capsule are applied according to according to an embodiment of the present invention.

FIG. 8 is a cross-sectional view illustrating a liquid crystal panel to which an FPCB and a cholesteric liquid crystal capsule are applied according to according to an embodiment of the present invention.

In a display device of the present invention, if a second substrate 205 is laminated through a transparent adhesive 140 included in a first substrate sheet including a liquid capsule of a cholesteric liquid crystal 123, a panel of a display device is manufactured. Accordingly, as illustrated in FIG. 8, a flexible substrate such as FPCB is preferably applied as the second substrate 205. The cholesteric liquid crystal 123 is applied as the liquid crystal, so that a reflective flexible liquid crystal display device by only a simple panel arrangement and process.

As illustrated in an embodiment of FIG. 8, an FPCB 205 is applied as the second substrate to form a switching element as a copper electrode 211 at an upper surface thereof, and a copper electrode 211 electrically connects to a driving IC 213.

Power is turned-off through application of the cholesteric liquid crystal 123 having a memory function to provide a characteristic in which an image continuously maintains. An FPCB 205 is applied as a lower substrate of a panel of a display device to simplify a module process and to improve process yield. Since a copper (Cu) electrode 211 is anodized to omit a black absorption layer essentially used in a conventional display device to which the cholesteric liquid crystal 123 is applied, there is no need to include a separate black absorption layer.

The foregoing liquid crystal capsule layer may be configured by a liquid crystal capsule layer of a multi-layer structure including a cholesteric liquid crystal capsule layer on a left-handed version and a cholesteric liquid crystal capsule layer on a right-handed version.

Figure 9:
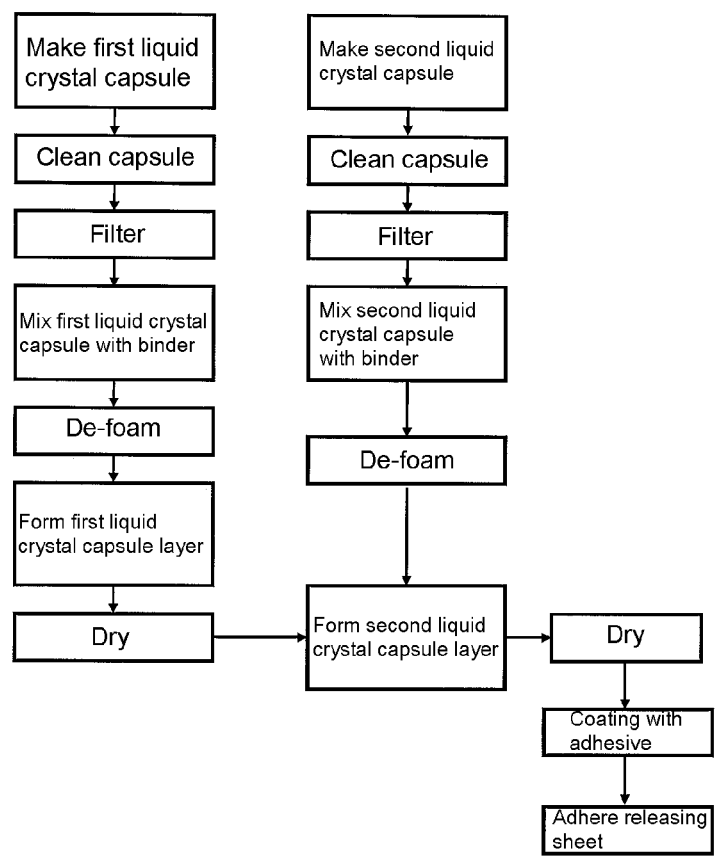
FIG. 9 is a process flowchart illustrating a method of manufacturing a liquid crystal display device including a liquid crystal capsule layer with a multi-layer structure according to a modified embodiment of the present invention.
Figure 10:
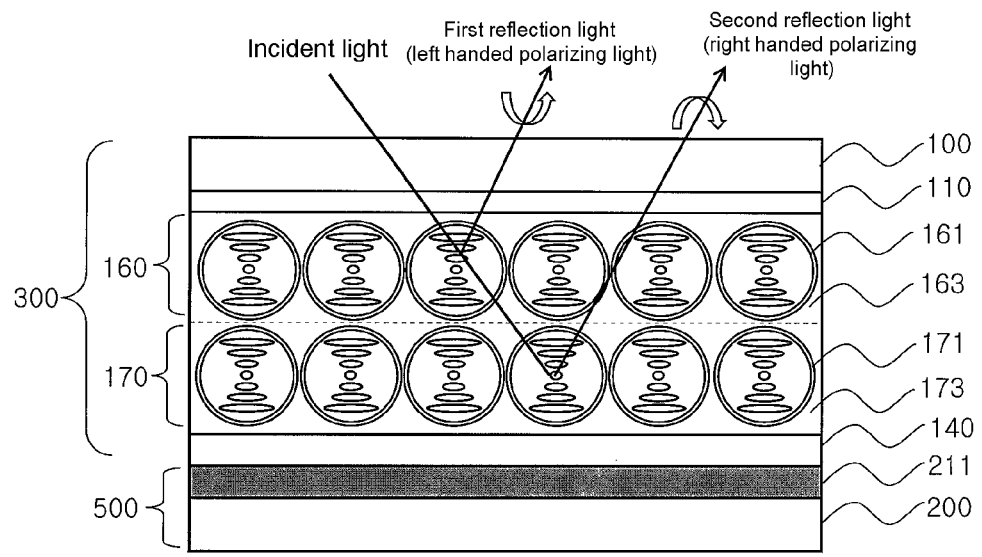
FIG. 10 is a view illustrating a first example of a liquid crystal display device manufactured through a process flowchart in FIG. 9.

FIG. 9 is a process flowchart illustrating a method of manufacturing a liquid crystal display device including a liquid crystal capsule layer with a multi-layer structure according to a modified embodiment of the present invention, and FIG. 10 is a view illustrating a first example of a liquid crystal display device manufactured through a process flowchart in FIG. 9.

A liquid crystal display device includes a first substrate sheet 300 and a second substrate sheet 500. The first substrate sheet 300 includes a first substrate 100, an upper electrode 110, a liquid crystal capsule layer, and an adhesive layer 140. The second substrate sheet 500 includes a second substrate 200 and a lower electrode 211 oxidized black. In particular, a liquid crystal capsule layer of the present invention is characterized that it is divided into a first liquid crystal capsule layer 160 and a second liquid crystal capsule layer 170 having different optical characteristics. There are a first liquid crystal capsule layer formed by a right-handed version cholesteric liquid crystal capsule and a second liquid crystal capsule layer formed by a left-handed version cholesteric liquid crystal capsule. The first liquid crystal capsule layer 160 includes a first liquid crystal capsule 161 and a binder 163. The second liquid crystal capsule layer 170 includes a first liquid crystal capsule 171 and a binder 173.

A process is divided into a process of manufacturing a first substrate sheet 300 and a process of manufacturing a second substrate sheet 500. The process of manufacturing a first substrate sheet 300 includes a step of forming the first liquid crystal capsule layer 160, a step of forming the second liquid crystal capsule layer 160, a coating step of an adhesive, and attaching step of a releasing sheet.

First, manufacturing the first substrate sheet 300 is performed by forming a transparent electrode 110 and a first liquid crystal capsule layer 160 on a first substrate in steps S300 to S360, forming a second liquid crystal capsule layer 170 thereon in steps S300 to S350, performing a dry step, coating a resultant object with an adhesive, and attaching a releasing sheet on the substrate.

Next, a process of manufacturing a second substrate sheet 500 of the present invention will be described. The second substrate sheet 500 process of the present invention is a process of forming an electrode on a side surface of a second substrate 200 laminated on the first substrate sheet 300, which corresponds to a process of forming a pattern of an lower electrode 211 including a pixel electrode and a gate electrode on the second substrate in a typical liquid crystal display device. The second substrate 200 is applicable to a glass substrate, a plastic substrate, and an FPCB of a polyimide material. There is a manner of constructing a lower electrode 211 constituting a second substrate sheet 500 as one of other technical characteristics of the liquid crystal display device according to the present invention.

A display device using a cholesteric liquid crystal should necessarily include a process of forming a separate black absorption layer on the second substrate. However, a liquid crystal display device according to the present invention provides a configuration of a device without a separate black absorption layer through a configuration of a lower electrode 211 anodizing surface processed.

That is, after a lower electrode 211 is formed on the second substrate 200, an oxide film is formed on a surface of the lower electrode to obtain a lower electrode 211 processed by a black film.

Because an oxide film formed on a surface of a lower electrode 211 black oxide according to the present invention may be substituted for a conventional black absorption layer, a process of forming an optical absorption layer may be omitted. Accordingly, the present invention has a positive effect in that a process of manufacturing a liquid crystal display device may be simplified and process yield may be improved, and conventional voltage drop due to an optical absorption layer may be prevented.

Referring to FIG. 10 illustrating a liquid crystal panel manufactured in this way, light incident to a liquid crystal display device of the present invention causes two reflections including a first reflection by the first liquid crystal capsule layer 160 and a second reflection by the second liquid crystal capsule layer 170.

That is, the liquid crystal display device according to the present invention has a multi-layered structure including a first liquid crystal capsule layer 160 of a left-handed version and a second liquid crystal capsule layer 170, reflects left-handed polarizing light (first reflecting light) and right-handed polarizing light (second reflecting light) for incident light of a wavelength region satisfying a selection reflection condition. This has an effect to increase a reflection rate as high as 50% or more in comparison with a cholesteric liquid crystal capsule display device.

As illustrated previously, a liquid crystal display device according to the present invention may reflect residual light passing through a first liquid crystal capsule layer 160 without reflection through a second liquid crystal capsule layer 170 by a liquid crystal capsule multi-layered structure having different optical characteristics to maximize a reflection rate of a display device. Accordingly, brightness of a reflection color or color purity may be increased to display fine color.

Figure 11:
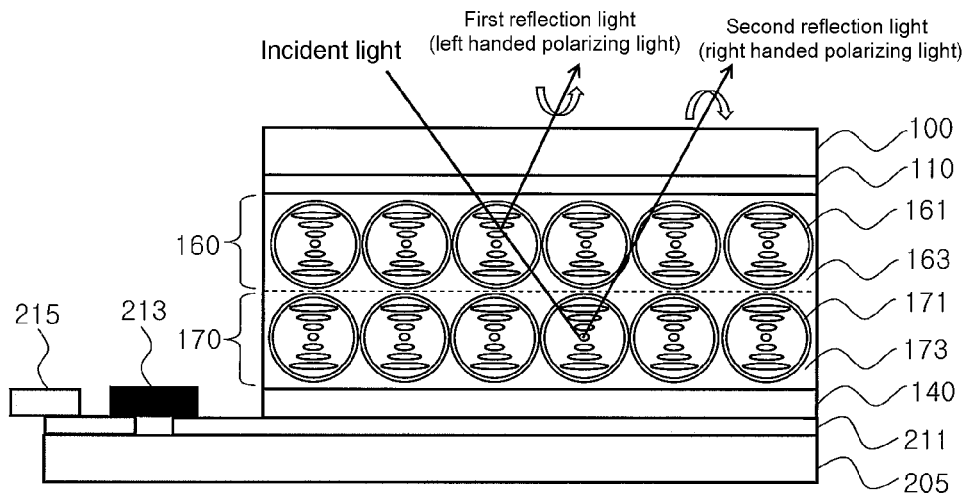
FIG. 11 is a view illustrating a second example of a liquid crystal display device including a liquid crystal capsule layer with a multi-layer structure according to the present invention.

FIG. 11 is a view illustrating a second example of a liquid crystal display device including a liquid crystal capsule layer with a multi-layer structure according to the present invention. In the liquid crystal display device according to a second embodiment of the present invention, an FPCB is applied as a second substrate 205 to form a copper (Cu) electrode 211 at an upper surface thereof, the copper electrode 211 electrically connects to a driving IC 213 and a connector 215. Copper electrode anodizing is substituted for a black absorption layer necessarily required in a conventional cholesteric liquid crystal by with the result that a separate black absorption layer is omitted.

As illustrated previously, although power is turned-off, a characteristic continuously maintaining an image may be obtained by applying a cholesteric liquid crystal having a memory function. Through a configuration of a lower substrate sheet 160 in which a first liquid crystal capsule layer 160 and a second liquid crystal capsule layer 170 are separately printed in a multi-layered structure, an optical characteristic (reflection rate) of a display device may be remarkably improved.

Further, because an FPCB is applicable as the second substrate 250, a module process may be simplified and process yield may be improved. As copper (Cu) electrode 211 anodizing is substituted for a black absorption layer necessarily used in a conventional display device using a cholesteric liquid crystal, a separate black absorption layer is not required.

In the first and second liquid crystal capsule layers manufactured by the foregoing process, a plurality of first and second liquid crystal capsules therein are randomly arranged in a binder to have first and second liquid crystal capsule layer structure in which liquid crystal capsules overlap each other or are mixed to form a layer. However, scattering of light transmitting the liquid crystal capsule layer occurs significantly in the liquid crystal capsule layer having the random arranged pattern to reduce light transmittance and accordingly deteriorates optical characteristics of a display device.

In order to solve the foregoing problem, a plurality of liquid crystal capsules having random arranged pattern are rearranged to configure a liquid crystal capsule layer having a mono-layer structure.

Specifically, with respect to at least 50% of a total area of the first liquid crystal capsule layer 160, a left-handed cholesteric liquid crystal capsule 161 is arranged in an upper portion of the upper electrode 110 in a mono-layer structure. With respect to at least 50% of a total area of the second liquid crystal capsule layer 170, a right-handed cholesteric liquid crystal capsule 171 is arranged in an upper portion of the first liquid crystal capsule layer 160 in a mono-layer structure.

For reference, as used in the present invention, the term "mono-layer structure" is defined. As used herein, the "mono-layer structure" does not mean that each one liquid crystal molecule is arranged as one molecule layer but means that each of first and second liquid crystal capsules collected by a plurality of liquid crystals are tightly closed and arranged in the form of one molecule layer. That is, if a left-handed cholesteric liquid crystal capsule is arranged between an upper substrate and a lower substrate when cutting the upper substrate and the lower substrate between a first liquid crystal capsule layer (second liquid crystal capsule layer) with, it corresponds to a mono-layer structure. However, if the first and second liquid crystal capsule layers 160 and 170 are manufactured to have a mono-layer structure, it is impossible or very difficult such that all left-handed liquid crystal capsules (or right-handed liquid crystal capsules) form 100% single layer through an entire region. Accordingly, the mono layer structure of the present invention means that a first liquid crystal capsule (or second liquid crystal capsule) is arranged in a single structure in an area of at least 50%, preferably, 70% or more of a total area of a first liquid crystal capsule (second liquid crystal capsule) laminated on an upper portion of the upper substrate.

The mono layer structure of the first liquid crystal capsule layer is obtained through a following manufacturing method. That is, after a first liquid crystal capsule layer 160 is printed/coated on one surface of the first substrate 100 through a formation step of forming the first liquid crystal capsule 160, a first substrate 100 on which the first liquid crystal capsule layer 160 is laminated is vibrated mechanically or repeatedly.

If a mechanical vibration of the first substrate 100 is performed, first liquid crystal capsule particles mixed with a binder 163 and located at an upper portion descend in a gravity direction. If such vibration of the first substrate 100 continuously repeats, a first descended liquid crystal capsule particle is pressurized in a spacing distance between first liquid crystal capsules tightly closed on a transparent electrode and is finally arranged in an arrange state to have a mono-layer structure on the transparent electrode 110. The descending and rearrangement of the first liquid crystal capsule are achieved by applying mechanical repeated vibration to the first substrate 100 using physical features of a first liquid crystal having a higher specific gravity than that of the binder 163, a volume or gravity which each capsule particle forms.

Further, so as to efficiently obtain descending and spacing space insertion operation of the first liquid crystal capsule by repeated operation of the first substrate 100, the repeated vibration is preferably performed to reciprocate in a surface direction of the first substrate 100 in left and right directions. For reference, the "surface direction" indicates a direction parallel with one surface on which the transparent electrode 110 is formed.

A method of rearranging the second liquid crystal capsule layer 170 in a mono-layer structure is the same as in the first liquid crystal capsule layer, and thus a detailed description thereof is omitted.

In addition, as illustrate previously, if an optical film having first and second liquid crystal capsule layers 160 and 170 having a thin thickness is applied to a device, a driving voltage of the device may be reduced.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

INDUSTRIAL APPLICABILITY

In a first substrate sheet, a liquid crystal panel having the first substrate sheet, and a method for manufacturing the same, among a pair of substrates constructing a panel, a first substrate integrally including a liquid crystal capsule, a transparent adhesive, and a releasing sheet is configured in the form of a sheet, a manufacturing process may be simplified, process yield may be improved, and manufacturing cost may be reduced through a laminating manner of the first substrate sheet and a second substrate. In particular, it is highly advantageous in manufacturing a flexible display to easily apply a roll-to-roll process, thereby increasing industrial applicability.

What is claimed is:

1. A first substrate sheet to be laminated to a second substrate having a surface on which a transparent electrode is patterned to configure a liquid crystal panel, the first substrate sheet comprising:
   a first substrate arranged to face the second substrate;
   a transparent electrode formed on one surface of the first substrate;
   a liquid crystal capsule layer comprising liquid crystal capsules which are mixed with a binder and printed on one surface of the first substrate on which the transparent electrode is formed;
   a transparent adhesive applied to entirely cover the liquid crystal capsule layer; and
   a releasing sheet which is attached to entirely cover the transparent adhesive, and which is made of a completely removable material which does not deteriorate the adhesive force of the transparent adhesive.

2. The first substrate sheet of claim 1, wherein the liquid crystal capsule layer includes:
   a first liquid crystal capsule layer including left-handed cholesteric liquid crystal capsules; and
   a second liquid crystal capsule layer including right-handed cholesteric liquid crystal capsules,
   one of the first liquid crystal capsule layer and the second liquid crystal capsule layer is firstly formed, and a remaining liquid crystal capsule layer is laminated on the one liquid crystal capsule layer to form a multi-layer.

3. The first substrate sheet of claim 1, wherein a liquid crystal used in the liquid crystal capsule layer is the one selected from nematic, smectic, cholesteric, and chiral smectic liquid crystals.

4. The first substrate sheet of claim 1, wherein the liquid crystal capsule layer includes a dichroic dye.

5. The first substrate sheet of claim 1, wherein the liquid crystal capsule layer includes a chiral dopant.

6. The first substrate sheet of claim 1, wherein the first substrate is formed by the one selected from polyethylene naphthalate (PEN), polyether sulfone (PES), polyarylate (PAR), polycarbonate (PC), and Polyethylene terephthalate (PET).

7. The first substrate sheet of claim 2, wherein the first liquid crystal capsule layer is formed by a mixture of the left-handed cholesteric liquid crystal capsules and a binder, and
   the left-handed cholesteric liquid crystal capsule is arranged on an upper portion of an upper electrode in a mono-layer structure in an area of at least 50% of a total area of the first liquid crystal capsule layer.

8. The first substrate sheet of claim 2, wherein the second liquid crystal capsule layer is formed by a mixture of the right-handed cholesteric liquid crystal capsules and a binder, and the right-handed cholesteric liquid crystal capsule is arranged on an upper portion of an upper electrode in a mono-layer structure in an area of at least 50% of a total area of the second liquid crystal capsule Layer.

9. A method of manufacturing a liquid crystal panel with a first substrate sheet, comprising:

a first substrate process of manufacturing the first substrate sheet by a first step of manufacturing a liquid crystal capsule including a liquid crystal, a second step of mixing the liquid crystal capsule with a binder and printing a mixture of the liquid crystal capsule and the binder on a surface of a first substrate on which a transparent electrode is formed, a third step of applying a transparent adhesive to entirely cover the mixture of the liquid crystal capsule and the binder, and a fourth step of attaching a releasing sheet which is made of a completely removable material which does not deteriorate the adhesive force of the transparent adhesive to entirely cover the transparent adhesive; and a second substrate process of patterning an electrode on a surface of a second substrate to be laminated on the first substrate sheet.

10. The method of claim 9, further comprising:

peeling and removing the releasing sheet attached to the first substrate sheet manufactured through the first substrate process; and laminating the second substrate with the first substrate sheet using an adhesive exposed due to removal of the releasing sheet.

11. The first substrate sheet of claim 2, wherein at least one of the first and the second liquid crystal capsule layers includes a dichroic dye.

12. The first substrate sheet of claim 2, wherein at least one of the first and the second liquid crystal capsule layers includes a chiral dopant.

13. The first substrate sheet of claim 2, wherein the first substrate is formed by the one selected from polyethylene naphthalate (PEN), polyether sulfone (PES), polyarylate (PAR), polycarbonate (PC), and Polyethylene terephthalate (PET).

14. The first substrate sheet of claim 7, wherein the second liquid crystal capsule layer is formed by a mixture of the right-handed cholesteric liquid crystal and a binder, and the right-handed cholesteric liquid crystal capsule is arranged on an upper portion of an upper electrode in a mono-layer structure in an area of at least 50% of a total area of the second liquid crystal capsule layer.

* * * * *